United States Patent [19]

Kneepkens et al.

[11] Patent Number: 5,440,596
[45] Date of Patent: Aug. 8, 1995

[54] TRANSMITTER, RECEIVER AND RECORD CARRIER IN A DIGITAL TRANSMISSION SYSTEM

[75] Inventors: Franciscus A. Kneepkens; Gerardus C. P. Lokhoff, both of Eindhoven, Netherlands

[73] Assignee: U.S. Philips Corporation, New York, N.Y.

[21] Appl. No.: 49,737

[22] Filed: Apr. 19, 1993

[30] Foreign Application Priority Data

Jun. 2, 1992 [EP] European Pat. Off. ............ 92201579

[51] Int. Cl.$^6$ .............................................. H04B 1/66
[52] U.S. Cl. ................... 375/240; 395/2.38; 395/2.39
[58] Field of Search ............... 375/122; 348/390, 397, 348/398, 399, 404, 405, 406, 408, 437, 438; 370/118; 395/2, 2.38, 2.39; 381/29, 31

[56] References Cited

U.S. PATENT DOCUMENTS

| | | | |
|---|---|---|---|
| 4,455,649 | 6/1984 | Esteban et al. | 395/2.38 |
| 4,535,472 | 8/1985 | Tomcik | 395/2.38 |
| 4,620,311 | 10/1986 | Schouhamer Immink | . |
| 4,896,362 | 1/1990 | Veldhuis et al. | . |
| 4,899,384 | 2/1990 | Crouse et al. | 395/2.38 |
| 5,214,678 | 5/1993 | Rault et al. | 375/122 |
| 5,214,741 | 5/1993 | Akamine et al. | 395/2 |
| 5,323,396 | 6/1994 | Lokhoff | 370/94.1 |
| 5,365,553 | 11/1994 | Veldhuis et al. | 375/122 |
| 5,367,608 | 11/1994 | Veldhuis et al. | 395/2.38 |

OTHER PUBLICATIONS

IEEE ICASSP 80, vol. 1, 327–331, Apr. 9–11, 1980, M. A. Krasner, "The Critical Band Coder . . . Digital Encoding of Speech Signals Based On Perpetual Requirements of The Auditory System".

Primary Examiner—Stephen Chin
Assistant Examiner—T. Ghebretinsae
Attorney, Agent, or Firm—Edward W. Goodman

[57] ABSTRACT

The transmission system includes a transmitter for transmitting a sub-band-coded signal which is accommodated in a second digital signal (FIG. 2) having frames which incorporate allocation information, scale factor information and samples. In order to perform an additional signal processing operation on the received signal at the receiver end, the bit allocation information is already adapted for this purpose at the transmitter end. A signal processing control signal indicating which type of additional signal processing operation will have to be performed may be transmitted along with the information.

19 Claims, 3 Drawing Sheets

5,440,596

TRANSMITTER, RECEIVER AND RECORD CARRIER IN A DIGITAL TRANSMISSION SYSTEM

BACKGROUND OF THE INVENTION

1. Field of the Invention

The invention relates to a transmitter and a receiver in a digital transmission system for transmitting and receiving a wideband signal via a transmission medium and to a record carrier.

2. Description of the Related Art

EP 402.973 A1 corresponding to U.S. Pat. No. 5,323,396, Reference (2) in the list of References at the end of this Application, discloses a transmitter for a digital transmission system for transmitting a wideband signal via a transmission medium, this wideband signal being sampled at a given sampling frequency $F_s$, for example a digital audio signal, which transmitter comprises an input terminal for receiving the wideband signal, signal splitting means for generating, in response to the wideband signal, a plurality of M narrow-band sub-signals at a decreased sampling frequency, for which purpose the splitting means split up the wideband signal into consecutive sub-bands having band numbers m which increase with the frequency, in which m complies with $1 < m < M$, a sub-signal being composed of consecutive signal blocks, each signal block comprising q samples, bit allocation means for generating bit allocation information indicating the quantity of bits by which q samples of a signal block are represented in a sub-band, and for applying the bit allocation information to quantizing means coupled to the signal splitting means and being adapted to quantize the M sub-signals in blocks in response to the bit allocation information of the bit allocation means, means for accommodating the quantized sub-signals and the bit allocation information in a frame of a second digital signal which is composed of consecutive frames, coding means for converting the second digital signal into a third digital signal so that it is suitable to be transmitted via the transmission medium, and means for applying the third digital signal to the transmission medium. This is a transmitter comprising a sub-band coder for sub-band coding the wideband signal. The transmission medium may be a magnetic medium. The transmitter may then be a magnetic recording apparatus of the DCC type as described in more extensive detail in EP 457.390 A1 and EP 457.391 A1, corresponding to U.S. Pat. Nos. 5,367,608 and 5,365,553, respectively, the References (6a) and (6b) in the list of References.

SUMMARY OF THE INVENTION

It is an object of the invention to provide two basic proposals for further improving the transmitter so that an even better signal transmission can be realized.

In the first proposal, the transmitter is characterized in that it further comprises signal processing means having an input coupled to the input terminal, an output and a control signal input, second signal splitting means having an input coupled to the output of the signal processing means for generating, in response to the processed digital signal of the signal processing means, a plurality of M sub-signals at a decreased sampling frequency, for which purpose the second splitting means split up the processed wideband signal into consecutive sub-bands having band numbers m which increase with the frequency, in which m complies with $1 < m < M$, in that the bit allocation means are coupled to the second splitting means for deriving the bit allocation information from the sub-band signals obtained from the processed wideband signal, and in that the signal processing means are adapted to process the wideband signal in dependence upon a signal processing control signal which is applied to the control signal input of the signal processing means.

In the second proposal, the transmitter is characterized in that it further comprises correction means coupled to the bit allocation means and to the quantizing means, which correction means have a control signal input, said correction means being adapted to correct the bit allocation information of the bit allocation means in dependence upon a signal processing control signal which is applied to the control signal input of the correction means and for applying the corrected bit allocation information to the quantizing means.

The invention is based on the following recognition.

Transmitter-receiver systems such as recording and reproducing apparatus are generally formed in such a way that the total transmission chain has a flat transfer characteristic as a function of the frequency.

Moreover, signal processors are increasingly being used in audio reproducing apparatus, with which processors the reproduced signal is additionally processed at the receiver end to obtain a desired spatial acoustic effect. An example is reverberation. If the reproduced signal is additionally processed in this way, the listener will be given the impression of being in a concert hall or in a church. However, also other types of signal processing operations such as frequency corrections are possible to obtain a desired additional effect in the reproduction of, for example jazz, classical music or disco music.

It is an object of the invention to adapt the information transmitted via the transmission medium in such a way in the transmitter that normal transmission is possible, at which the flat transfer characteristic is maintained, but that the additional signal processing operation is also possible at the reproducing end. In fact, the invention realizes an optimization of the bit allocation in the transmitter in such a way that the normal transmission remains possible, while moreover an optimum reproduction of the special effects can be realised.

In the two above-mentioned proposals, this is realized by tatting the additional signal processing operation which will be desired in the receiver already into account in the bit allocation. In fact, in the bit allocation a worst case situation is taken into account so that sufficient bits are allocated to realize a satisfactory reproduction in both situations, viz. that of the normal reproduction and that of the reproduction with the additional signal processing operation.

If the signal is amplified to a relatively larger extent in a given frequency range when the additional signal processing operation is performed, this larger amplification will have to be taken into account in the bit allocation by applying more bits to the samples in the signal in the relevant frequency range. After quantization, the samples are then represented by more bits.

If all available bits are allocated in the normal mode of allocating bits, as described in References (6a) and (6b), the extra allocation of bits to a number of samples means that fewer bits should be allocated to other samples. This can be realized by taking bits off those samples to which more than a required minimum number of bits have already been allocated in the normal bit allocation procedure. If not all bits are allocated in the normal bit allocation procedure, there are still bits left to realize the extra allocation without taking bits off other samples.

The transmitters according to the invention may be further characterized in that the transmitter comprises means for applying the signal processing control signal to the transmission medium. This creates the possibility of detecting the signal processing control signal at the receiver end again so that the additional signal processing operation at the receiver end can be realized automatically, viz. by applying the detected signal processing control signal to the signal processing means of the receiver.

The signal processing control signal may be additionally applied to a display of the receiver. Under the influence of this control signal the display may then visualize an indication of the type of the additional signal processing operation performed on the signal.

It is to be noted that Reference (2) describes how a frequency emphasis is performed in the receiver on the audio information to be reproduced, so as to compensate for a pre-emphasis already performed on the audio information at the pickup end. To render this frequency emphasis possible upon reproduction, information indicating the type of frequency emphasis to be used is transmitted. This frequency emphasis is thus intended to compensate for imperfections in the transmission channel. Consequently, it is not information indicating that a signal processing operation must be performed to obtain an additional effect such as, for example a spatial acoustic effect.

BRIEF DESCRIPTION OF THE DRAWINGS

These and other aspects of the invention will be apparent from and elucidated with reference to the embodiments described hereinafter.

In the drawings

DESCRIPTION OF THE PREFERRED EMBODIMENT

Figure 1A:
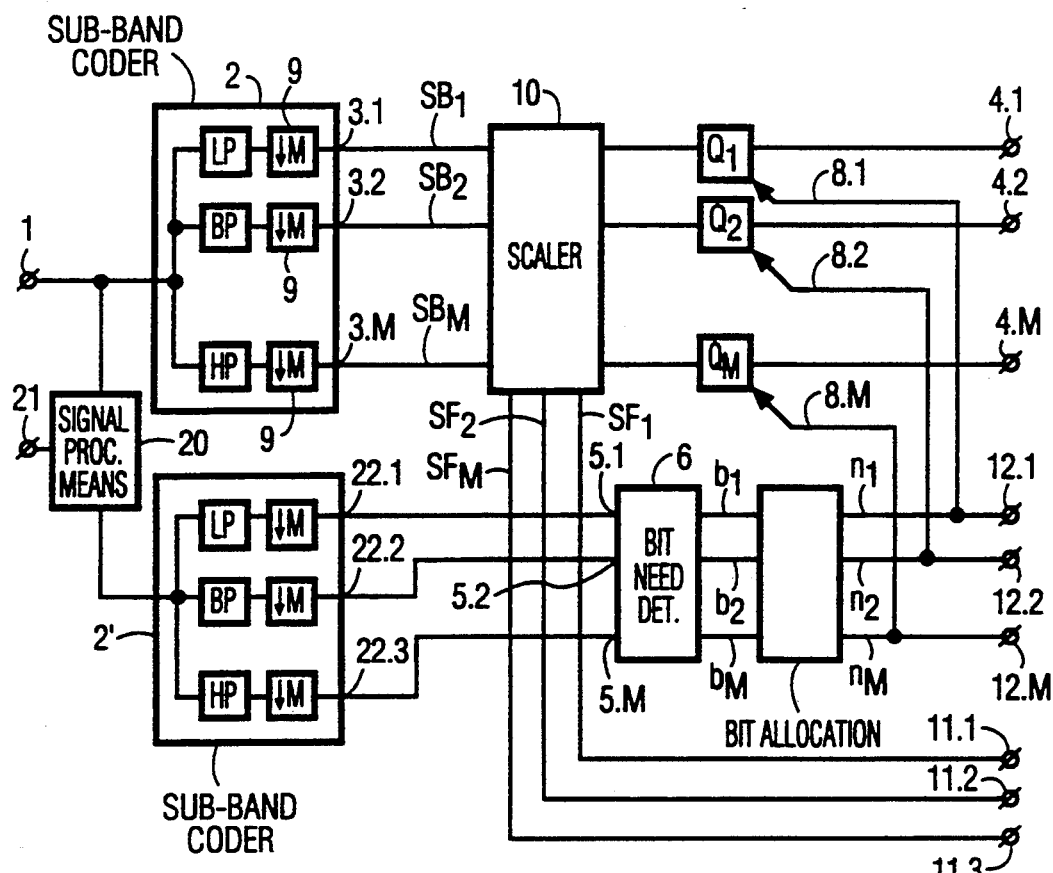
FIGS. 1a, 1b and 1c show the transmitter in the transmission system.

FIG. 1 shows the coding device of the transmitter in FIG. 1a. A wideband digital signal is applied to an input terminal 1. This may be an audio signal having a bandwidth of approximately 20 kHz. The audio signal may be a stereo audio signal. In that case only one of the two signal parts (the left or the right signal part) of the stereo audio signal will be described. The other signal part is treated identically.

The input 1 receives, for example 16-bit samples of, for example the left signal part of the audio signal at a sampling frequency of 44 kHz. The audio signal is applied to a sub-band coder 2 which comprises splitting means. The splitting means in the sub-band coder 2 distribute the audio signal over M sub-bands by means of a plurality of M filters, viz. a low-pass filter LP, M-2 bandpass filters BP and a high-pass filter HP. M is equal to, for example 32. The M sub-band signals are decreased in sampling frequency in the blocks denoted by the reference numeral 9. In these blocks the sampling frequency is decreased by a factor of M. The signals thus obtained are presented at the outputs 3.1, 3.2, ..., 3.M. The signal in the lowest sub-band $SB_1$ is presented at the output 3.1. The signal in the lowest but one sub-band $SB_2$ is presented at the output 3.2. The signal in the highest sub-band $SB_M$ is present at the output 3.M. The signals at the outputs 3.1 to 3.M are in the form of consecutive samples which are expressed in 16 or more, for example 24-bit numbers. In the relevant embodiment all sub-bands $SB_1$ to $SB_M$ have the same width.

However, this is not necessary. In the prior art publication Reference (3), Krasner, for example a division into a number of sub-bands is given whose bandwidths approximately correspond to the bandwidths of the critical bands of the human ear in the respective frequency ranges.

The operation of the sub-band coder 2 will not be further explained because it has already been described extensively. To this end reference is made to References (1), (3) and (5) which, where necessary, are herein incorporated by reference.

Figure 1B:
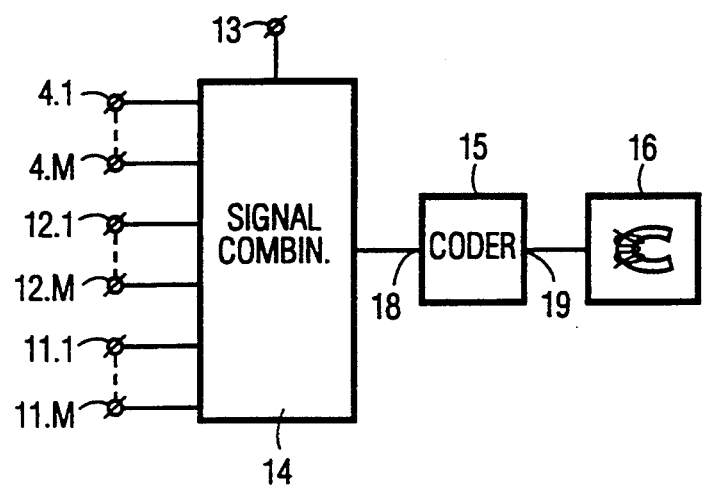
Figure 1C:
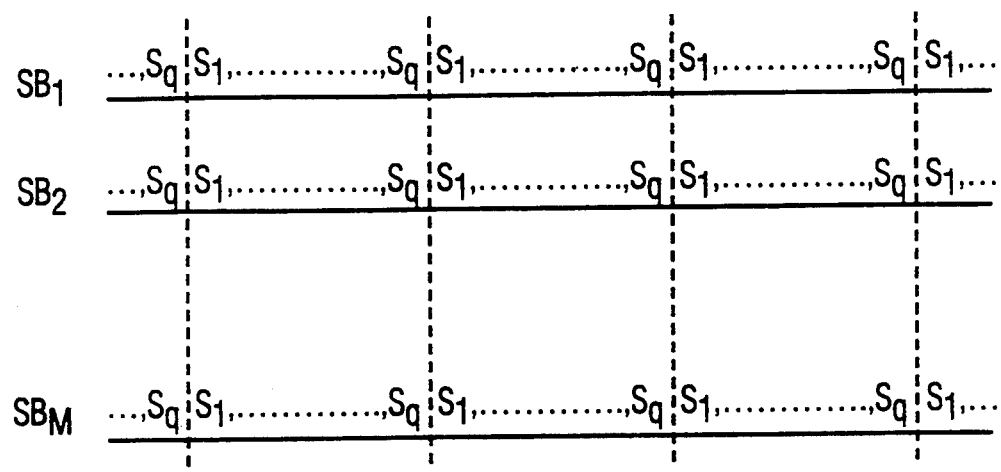

The sub-band signals are combined in consecutive signal blocks of q consecutive samples, see FIG. 1c, and are applied to an associated quantizer $Q_1$ to $Q_M$. In a quantizer $Q_m$ the samples are quantized to form quantized samples with a number of bits $n_m$ which is smaller than 16.

FIG. 1 shows how the left sub-band signals are applied to an associated quantizer $Q_m$ in signal blocks of q consecutive samples. Similarly, the right sub-band signals are applied to an associated quantizer (not shown) in signal blocks of q consecutive samples. During quantization the signal blocks (groups) of q consecutive samples of the sub-band signal parts are quantized to a smaller number of bits. q is equal to, for example 12. The q samples in a signal block are first scaled. This scaling is effected in the block denoted by 10 by dividing the amplitudes of the q samples by the amplitude of the sample having the largest absolute value in the signal block. The amplitude of the sample having the largest amplitude in the signal block of the sub-band $SB_m$ yields the scale factor $SF_m$, see Reference (2). Subsequently the amplitudes of the scaled samples, which are now within an amplitude range between $-1$ and $+1$, are quantized.

Reference (2) extensively describes this quantization, see FIGS. 24, 25 and 26 and the associated description in this document.

The quantized at samples in the sub-bands $SB_1$ to $SB_M$ are subsequently presented at the outputs 4.1 to 4.M.

The input terminal 1 is also coupled to an input of signal processing means 20. The signal processing means 20 perform a signal processing operation on the input signal in such a way that the desired additional effect, as described hereinbefore, is obtained. This may mean that the signal processing means 20 add, for example reverberation to the audio signal, so that during reproduction a listener is given the impression of being in a concert hall or a church. The signal processing means 20 may also perform a frequency correction on the input signal, or a compression or expansion of the dynamic range. Such signal processing operations are often used for jazz or disco music.

The signal applied to the input terminal 1 may be an analog signal. The D/A conversion can only take place downstream of the processor 20. In that case, a second A/D converter is incorporated in the connection between the input terminal 1 and the input of the splitting means 2, and downstream of the branch to the signal processor 20. The signal processor 20 is now analog. It is alternatively possible for the A/D conversion to take place upstream of the signal processor 20, for example in the connection between the input terminal and the input of the splitting means 2 and upstream of the branch to the signal processor 20. In that case the processor 20 is digital.

The signal processor 20 has a control signal input 21 to which a signal processing control signal is applied. Under the influence of the signal processing control signal which is indicative of the type of signal processing operation which can be performed on the input signal, the signal processor 20 processes the input signal in accordance with this type of signal processing operation. The signal thus processed is applied to the input of second splitting means 2' which are similar to the splitting means 2. Consequently, M sub-band signals obtained from the processed input signal appear at the outputs 22.1 to 22.M.

The outputs 22.1 to 22.M are coupled to the inputs 5.1 to 5.M, respectively of means 6 for determining the need of bits. The means 6 for determining the need of bits determine the bit need $b_m$ for signal blocks, which correspond to one another with respect to time, of q samples of the sub-band signals of the processed signal in the sub-bands $SB_1$ to $SB_M$. The bit need $b_m$ is a number which is in relation to the number of bits with which the q samples in a signal block of q samples in a sub-band signal of the processed signal would have to be quantized in the sub-band with the serial number of m.

The bit needs $b_1$ to $b_M$, derived by the means 6 for determining the need of bits, are applied to bit allocation means 7. Starting from the bit needs $b_1$ to $b_M$, the bit allocation means 7 determine the real number of bits $n_1$ to $n_M$ with which the q samples of the corresponding signal blocks in the sub-band signals obtained from the processed signal are quantized. Control signals corresponding to the numbers $n_1$ to $n_M$ are applied to the respective quantizers $Q_1$ to $Q_M$ via the leads 8.1 to 8.M. The special feature thus is that the signal which is not processed in the signal processor 20 is quantized on the basis of the bit allocation information $n_1$ to $n_M$ obtained from the signal processed by the signal processor 20.

It is of course evident that due to the introduction of a correct delay in the signal path of the unprocessed signal, or, in contrast, in the signal path of the processed signal, viz. in the signal path having the shortest delay, it can be ensured that the bit allocation information for a given set of M corresponding signal blocks is available at the outputs of the bit allocation means 7 at the instant when the relevant set of M corresponding signal blocks is present at the inputs of the quantizers $Q_1$ to $Q_M$.

The References (6a) and (6b) of the list of References extensively describe how the means 6 for determining the bit needs and the bit allocation means 7 can function.

The quantized samples in the signal blocks of the sub-band signals are subsequently applied to inputs 4.1 to 4.M of a signal combination unit 14. The bit allocation information, which is composed of the numbers $n_1$ to $n_M$, is also applied after a possible conversion to inputs 12.1 to 12.M of the combination unit 14. Reference (2) indicates that the numbers in the bit allocation information indicating the number of bits by which samples are represented are convened to y-bit code words in which y is equal to 4, see FIG. 9 in Reference (2). The scale factor information, which is composed of the scale factors $SF_1$ to $SF_M$, is also applied after a possible conversion to the inputs 11.1 to 11.M of the combination unit 14.

FIG. 1b shows the second part of the transmitter which in addition to the combination unit 14 comprises a second coder 15 and means 16 for applying the signal presented at its input to a transmission medium. This transmission medium is a magnetic record carrier in this case.

In addition to the samples, the bit allocation information and the scale factor information for the left signal parts in the sub-bands, the samples, the bit allocation information and the scale factor information for the right signal pans in the sub-bands are of course also applied to the combination unit 14. The unit 14 combines the signals and accommodates them serially in consecutive frames of a second digital signal which is presented at its output 17.

Figure 2:
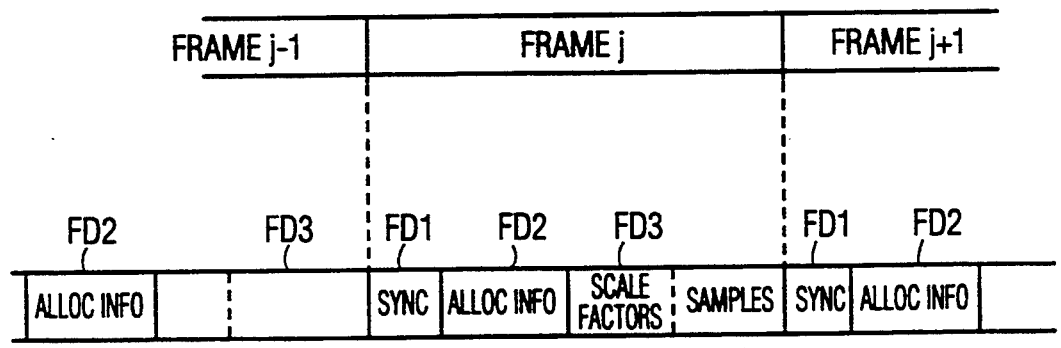
FIG. 2 shows the second digital signal generated by the transmitter.

FIG. 2 shows the format of this second digital signal. This format is described extensively in Reference (2) in the list of References which, where necessary, is herein incorporated by reference. FIG. 2 shows the second digital signal with the consecutive frames $j-1, j, j+1$ and shows how a frame may be built up. The frame comprises a first frame part FD1 which may comprise synchronization information, a second frame pan FD2 which comprises the allocation information and a third frame part FD3. This third frame pan comprises the scale factor information first, followed by the samples of the quantized signals in the sub-bands. For a further description reference is made to Reference (2).

The second digital signal is applied to the input 18 of the second coder 15. In this coder 15 the second digital signal is coded in such a way that an error correction of the received information is possible at the receiver end. To this end, for example a Reed Solomon coding and possibly an interleaving is performed on the second digital signal. The signal is further coded in such a way that the information to be transmitted is suitable for transmission via the transmission medium. To this end, for example an 8-to-10 conversion may be performed on the 8-bit words constituting the signal. Such an 8-to-10 conversion is described, for example in European Patent Application 150.082 corresponding to U.S. Pat. No. 4,620,311 (PHN 11.117) in the name of the Applicant. In this conversion, the information words are convened from 8-bit code words to 10-bit code words.

The third digital signal thus obtained is presented at the output 19. This output 19 is coupled to the input of means 16 which are formed as recording means 16 for recording the third digital signal on a magnetic record carrier.

The control signal input 21 is preferably also coupled to an input 13 of the unit 14. The unit 14 is then also adapted to apply the signal processing control signal to the frames and to store information which is related to this control signal in a frame part of the frames, preferably in the first frame part FD1.

Figure 3:
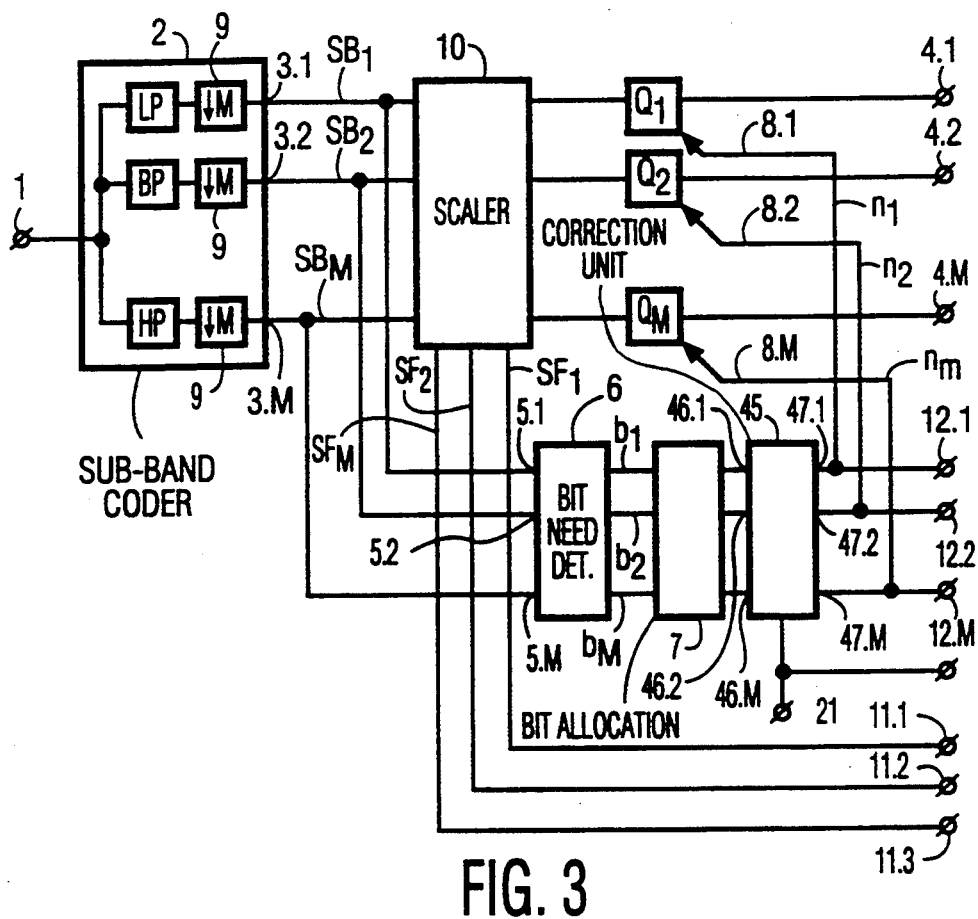
FIG. 3 shows a part of a second embodiment of the transmitter according to the invention.

FIG. 3 shows the first part of a second embodiment of the transmitter according to the invention. This part could be used instead of the part shown in FIG. 1a of the transmitter of FIG. 1. The pan of FIG. 3 shows great resemblance to the pan of FIG. 1a, with the difference that the signal processing means 20 and the second splitting means 2' have been omitted, while a correction unit 45 is added between the bit allocation means 7 and the leads 8.1 to 8.M to the quantizers $Q_1$ to $Q_M$. The inputs 5.1 to 5.M are further coupled in known manner to the outputs 3.1 to 3.M of the splitting means 2. The device without the correction means 45 would code the input signal in known manner, and this in such a way that a possible additional signal processing at the receiver end would not be taken into account. Under the influence of the signal processing control signal applied to the control signal input 21, the correction means 45 now correct the bit allocation information of the bit allocation means 7 in such a way that this signal processing operation at the receiver end is taken into account. In fact, this means that the correction means 45 convert the bit allocation information of the bit allocation means 7 to the allocation information $n_1$ to $n_M$ as obtained by means of the device of FIG. 1.

Figure 4:
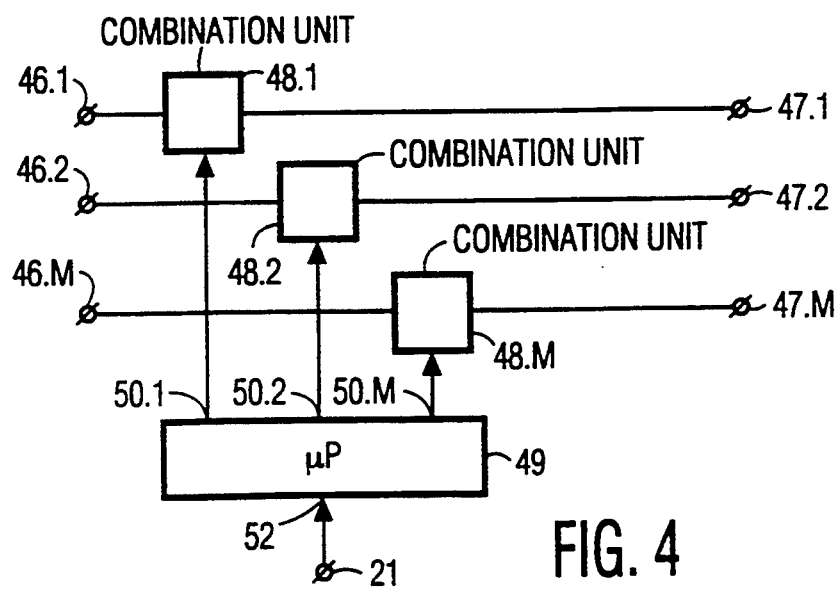
FIG. 4 shows an embodiment of the correction means in FIG. 3.

The correction means may be formed in the way as is shown in FIG. 4. An input 46.m is coupled to an output 47.m via a combination unit 48.m. The control signal input 21 is coupled to an input 52 of a microprocessor 49. Outputs 50.1 to 50.M of the microprocessor 49 are coupled to second inputs of the combination units 48.1 to 48.M.

Under the influence of a control signal which is presented at the input 21, the microprocessor 49 generates correction values at one or more outputs 50.1 to 50.M, which values are applied to the combination units 48.1 to 48.M. Dependent on the type of control signal, and hence dependent on the type of signal processing operation performed on the audio information at the receiver end, other correction values are supplied from the outputs 50.1 to 50.M. The sets of correction values for the different control signals, hence for the different signal processing operations, may be stored, for example in associated memory sites in the microprocessor 49 and are read from the associated memory sites when a control signal is applied. The correction values are, for example values (in numbers of bits per sample) which must be added to the values applied by the bit allocation means 7 to the inputs 46.1 to 46.M.

For "reverberation" this could mean, for example that a different set of correction values must be generated each time for consecutive signal blocks of q samples.

Figure 5:
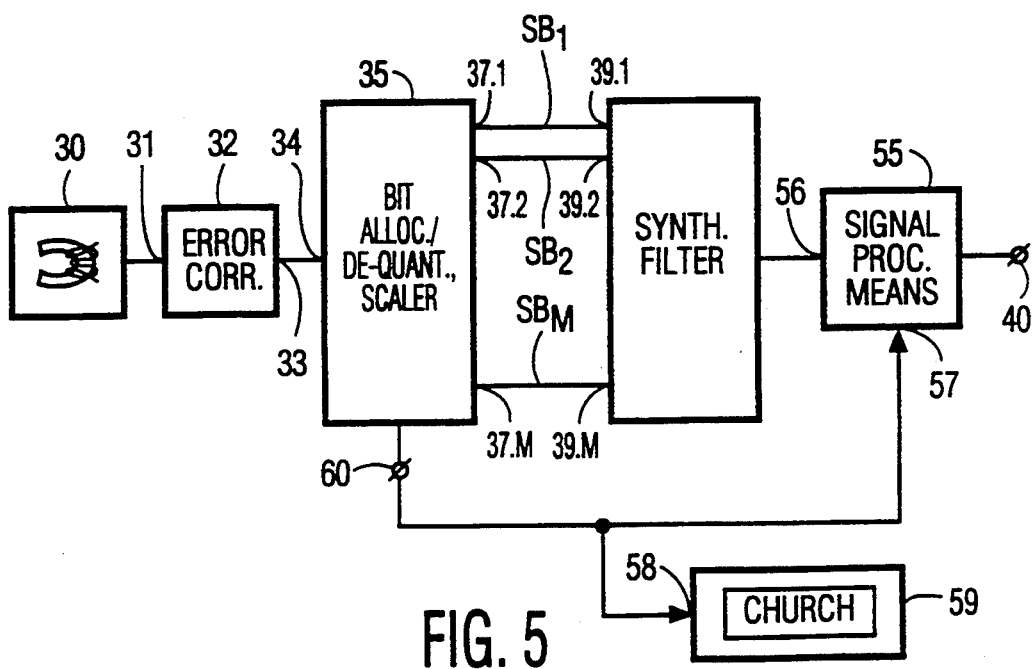
FIG. 5 shows an embodiment of a receiver.

FIG. 5 shows diagrammatically an embodiment of the receiver according to the invention. The receiver comprises means 30 for receiving the third digital signal from the transmission medium. In this case the means 30 are formed as read means for reading the information from a magnetic record carrier. The third digital signal which has been read is applied to an input 31 of error correction means 32. In the means 32 a 10-to-8 conversion is realized first. Subsequently, an error correction and a possible deinterleaving operation is performed on the information which has been read. The signal thus decoded corresponds again to the digital signal as is shown in FIG. 2. This signal is presented at an output 33. As is shown in FIG. 2, the means 35 derive the allocation information, the scale factor information and the samples for each signal block in each sub-band from the frames. After dequantization and multiplication by the scale factors, the sub-band signals $SB_1$ to $SB_M$ then appear at the outputs 37.1 to 37.M. These sub-band signals are presented at inputs 39.1 to 39.M of synthesis filter means 36 which compose the original digital signal again from the sub-band signals. The operation of these synthesis filter means 36 has been described extensively in Reference (5) in the list of References. The original digital signal is presented at an input 56 of signal processing means 55 by means 36, possibly after D/A conversion. After processing in the processing means 55 the signal thus processed is presented at an output 40 of the receiver. This is, for example the left signal part of the original signal. It is of course evident that the means 35 have M outputs at which the sub-band signals of the right signal part are available. Synthesis filter means (not shown) such as the filter means 36 are present to reconstruct the original right signal part from these sub-band signal parts.

The means 35 possibly also derive the signal processing control signal from the frames and apply this control signal to an output 60 which is coupled to a control signal input 57 of the signal processing means 55. The operation of the signal processing means 55 is identical to the operation of the signal processing means 21 as described with reference to FIG. 1a.

The output 60 may be further coupled to an input 58 of a display 59. Under the influence of the control signal applied to the display 59, the display shows which type of signal processing operation has been performed on the audio signal by the processing means 55.

It is to be noted that the greater part of the description of the invention refers to coding and transmission of a monosignal. However, the invention is not limited thereto. The invention is also applicable to coding a stereo signal in which two signal pans, viz. left and right are present in each sub-band. The invention is also applicable to coding devices in which one or more of the sub-band signals can be coded in a stereo intensity mode. For an explanation of the intensity mode coding reference is made to References (2) and (4) in the list of References. It is also to be noted that the invention is not limited to a transmitter in which the splitting means split up the wideband signal into sub-bands, but that instead a transform coding may alternatively be employed in the splitting means.

References (1) European Patent Application No. 289.080, corresponding to U.S. Pat. No. 4,896,362 (PHN 12.108)
(2) European Patent Application No. 402.973, corresponding to U.S. Pat. No. 5,223,396 (PHN 13.241)
(3) IEEE ICASSP 80, vol. 1,327–331, Apr. 9–11, 1980 M.A. Krasner "The critical band coder ... Digital encoding of speech signals based on the perceptual requirements of the auditory system".
(4) Netherlands Patent Application No. 9100173 (PHN 13.581)
(5) European Patent Application No. 400.755, corresponding to U.S. Pat. No. 5,214,678 (PHQ 89.018A)
(6a) Netherlands Patent Application No. 90.01.127, corresponding to U.S. Pat. No. 5,367,608 (PHN 13.328)
(6b) Netherlands Patent Application No. 90.01.128, corresponding to U.S. Pat. No. 5,365,553 (PHN 13.329)
(7) European Patent Application No. 150.081, corresponding to U.S. Pat. No. 4,680,311 (PHN 11.117)

We claim:

1. A transmitter for a digital transmission system for transmitting a signal representing a wideband signal via a transmission medium, said wideband signal being sampled at a given sampling frequency $F_s$, said transmitter comprising:

an input terminal for receiving the wideband signal;

signal splitting means coupled to said input terminal for generating, in response to the wideband signal, a plurality of M narrow-band sub-signals at a decreased sampling frequency, said splitting means splitting up the wideband signal into consecutive sub-bands having band numbers m which increase with the frequency, where $1 \leq m \leq M$, a sub-signal being composed of consecutive signal blocks, each signal block comprising q samples;

bit allocation means for generating bit allocation information indicating the quantity of bits by which the q samples of a signal block are represented in a sub-band;

quantizing means having input means coupled to the signal splitting means and control input means coupled to said bit allocation means, said quantizing means quantizing the M sub-signals in blocks in response to the bit allocation information from the bit allocation means;

means for converting the quantized sub-signals into another digital signal suitable to be transmitted via the transmission medium; and means for applying the another digital signal to the transmission medium;

characterized in that the transmitter further comprises:

signal processing means having an input coupled to the input terminal, an output and a control signal input;

second signal splitting means having an input coupled to the output of the signal processing means for generating, in response to the processed digital signal of the signal processing means, a plurality of M sub signals at a decreased sampling frequency, said second signal splitting means splitting up the processed wideband signal into consecutive sub-bands having band numbers m which increase with the frequency, said bit allocation means being coupled to said second signal splitting means for deriving the bit allocation information from the M sub-signals of the split up processed wideband signal, said signal processing means processing the wideband signal in dependence upon a signal processing control signal which is applied to the control signal input of the signal processing means.

2. A transmitter as claimed in claim 1, characterized in that the transmitter further comprises means for applying the signal processing control signal to the converting means whereby both the quantized sub signals and the signal processing control signal are included in the another digital signal for application to the transmission medium.

3. A transmitter as claimed in claim 1, characterized in that the signal processing control signal is related to a signal processing operation performed on the wideband signal in such a way that a spatial acoustic effect is realized in the processed wideband signal.

4. A transmitter as claimed in claim 1, characterized in that the transmitter is in the form of a device for recording the another digital signal on a record carrier.

5. A transmitter as claimed in claim 4, characterized in that the record carrier is a magnetic record carrier.

6. A receiver to be used in combination with a transmitter as claimed in claim 3, comprising:

read means for receiving the another digital signal from the transmission medium;

means for converting at least a portion of the another digital signal into the quantized sub signals and the bit allocation information;

synthesis filter means for constructing, in response to the respective quantized sub-signals, a replica of the wideband signal, said synthesis filter means combining the quantized sub-signals at an increased sampling frequency to the signal band of the wideband signal;

characterized in that the receiver further comprises:

means for deriving the signal processing control signal from the another digital signal read from the transmission medium; and signal processing means for performing a signal processing operation on the wideband signal, said signal processing means having a control signal input which is coupled to an output of the means for deriving the signal processing control signal, said signal processing means performing a signal processing operation on the replica of the wideband signal in dependence upon the signal processing control signal applied to the control signal input.

7. A receiver as claimed in claim 6, characterized in that the signal processing means performs a signal processing operation in such a way that a spatial acoustic effect is realized in the processed replica of the wideband signal.

8. A receiver as claimed in claim 6, characterized in that the receiver is in the form of a device for reading the third digital signal from a record carrier.

9. A receiver as claimed in claim 8, characterized in that the record carrier is a magnetic record carrier.

10. A receiver as claimed in claim 6, characterized in that the receiver comprises a display having a control signal input which is coupled to the output of the means for deriving the signal processing control signal, the display indicating, in dependence upon the signal processing control signal presented at the control signal input, the type of spatial acoustic effect realized by the signal processing means.

11. A transmitter as claimed in claim 2, characterized in that the transmitter is in the form of a device for recording the another digital signal on a record carrier.

12. A record carrier obtainable by means of the transmitter as claimed in claim 11, characterized in that the signal processing control signal is recorded on the record carrier.

13. A transmitter as claimed in claim 2, characterized in that the signal processing control signal is related to a signal processing operation performed on the wideband signal in such a way that a spatial acoustic effect is realized in the processed wideband signal.

14. A transmitter as claimed in claim 11, characterized in that the record carrier is a magnetic record carrier.

15. A transmitter for a digital transmission system for transmitting a signal representing a wideband signal via a transmission medium, said wideband signal being sampled at a give sampling frequency $F_s$, said transmitter comprising:

an input terminal for receiving the wideband signal;

signal splitting means coupled to said input terminal for generating, in response to the wideband signal, a plurality of M narrow-band sub-signals at a decreased sampling frequency, said signal splitting means splitting up the wideband signal into consecutive sub-bands having band numbers m which increase with the frequency, where $1 \leq m \leq M$, a sub-signal being composed of consecutive signal blocks, each signal block comprising q samples;

bit allocation means coupled to said signal splitting means for generating bit allocation information indicating the quantity of bits by which the q samples for a signal block are represented in a sub-band;

quantizing means having input means coupled to the signal splitting means and control input means coupled to said bit allocation means, said quantizing means quantizing the M sub-signals in blocks in response to bit allocation information of the bit allocation means;

means for converting the quantized sub-signals into another digital signal suitable to be transmitted via the transmission medium; and means for applying the quantized sub-signals to the transmission medium;

characterized in that the transmitter further comprises:

correction means coupled between said bit allocation means and the control input means of said quantizing means, said correction means having a control signal input, said correction means correcting the bit allocation information of the bit allocation means in dependence upon a signal processing control signal which is applied to the control signal input of the correction means and applying the corrected bit allocation information to the control input means of said quantizing means.

16. A transmitter as claimed in claim 15, characterized in that the transmitter further comprises means for applying the signal processing control signal to the converting means whereby both the quantized sub signals and the signal processing control signal are included in the another digital signal for application to the transmission medium.

17. A transmitter as claimed in claim 15, characterized in that the signal processing control signal is related to a signal processing operation performed on the wideband signal in such a way that a spatial acoustic effect is realized in the processed wideband signal.

18. A transmitter as claimed in claim 15, characterized in that the transmitter is in the form of a device for recording the another digital signal on a record carrier.

19. A transmitter as claimed in claim 18, characterized in that the record carrier is a magnetic record carrier.

* * * * *